(12) United States Patent
Shastry

(10) Patent No.: US 10,018,479 B2
(45) Date of Patent: Jul. 10, 2018

(54) PASSENGER ASSIST DEVICE AND ASSOCIATED METHODS THEREOF

(71) Applicant: Panasonic Avionics Corporation, Lake Forest, CA (US)

(72) Inventor: Shankar Shastry, Irvine, CA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 76 days.

(21) Appl. No.: 15/210,575

(22) Filed: Jul. 14, 2016

(65) Prior Publication Data

US 2018/0017409 A1    Jan. 18, 2018

(51) Int. Cl.
*G01C 17/38*    (2006.01)
*G01C 21/36*    (2006.01)
*G01C 21/34*    (2006.01)

(52) U.S. Cl.
CPC ..... *G01C 21/3682* (2013.01); *G01C 21/3476* (2013.01); *G01C 21/3605* (2013.01); *G01C 21/3629* (2013.01); *G01C 21/3697* (2013.01)

(58) Field of Classification Search
CPC ............ G01C 21/3682; G01C 21/3476; G01C 21/3605; G01C 21/3629; G01C 21/3697
USPC ........................................................ 701/526
See application file for complete search history.

(56) References Cited

U.S. PATENT DOCUMENTS

| 7,454,203 | B2 | 11/2008 | Levitan |
| 8,700,250 | B1 | 4/2014 | Curtis et al. |
| 9,786,145 | B2* | 10/2017 | Oppenheimer .... G08B 13/2428 |
| 2008/0030300 | A1* | 2/2008 | Naito ..................... G06Q 30/02 340/5.1 |
| 2009/0187640 | A1 | 7/2009 | Delia et al. |
| 2010/0268450 | A1 | 10/2010 | Evanitsky |
| 2012/0214575 | A1* | 8/2012 | Amaitis ................. G06Q 50/34 463/25 |
| 2013/0063612 | A1 | 3/2013 | Royster et al. |
| 2013/0131971 | A1* | 5/2013 | Parrish ..................... G06F 3/01 701/408 |
| 2014/0305828 | A1* | 10/2014 | Salvo ................. G08B 13/1654 206/459.1 |
| 2016/0080913 | A1* | 3/2016 | Thogersen ............ B62B 3/1424 455/456.3 |

(Continued)

OTHER PUBLICATIONS

"GateGuru", www.gateguru.com 2013, TripAdvisor LLC.

(Continued)

*Primary Examiner* — Harry Y Oh
(74) *Attorney, Agent, or Firm* — Klein, O'Neill & Singh, LLP

(57) ABSTRACT

Methods and systems for boarding a transportation vehicle are provided. One method includes configuring a passenger assist device (PAD) for use at a location for arriving and departing transportation vehicles by storing location data with maps and amenities information for the location; initializing a location tracking module to prevent unauthorized removal of the PAD from the location by a passenger; selecting a language by the passenger for communication with the PAD, when the passenger does not want to use a default language; retrieving connection and passenger transportation vehicle boarding location from where the passenger boards the vehicle; and presenting directions to the boarding location and information regarding amenities along a route to the boarding location.

20 Claims, 5 Drawing Sheets

(56) References Cited

U.S. PATENT DOCUMENTS

2017/0228667 A1* 8/2017 Duschl ................ G06Q 10/025

OTHER PUBLICATIONS

"Mobile Tools", https://www.united.com/web/en-US/content/travel/wireless/, May 11, 2016, United Airlines.
Harkola, Suzi, "RFID Technology Protects Business Against Theft" The Point of Sale News http:/pointofsale.com, Oct. 10, 2012.

* cited by examiner

PASSENGER ASSIST DEVICE AND ASSOCIATED METHODS THEREOF

TECHNICAL FIELD

The present disclosure relates to apparatus for assisting passengers to improve their travel experience.

BACKGROUND

Transportation vehicles, for example, aircraft, trains, buses, boats, recreation vehicles and other similar vehicles are commonly used to travel. When travelling from one location to another, a passenger may need to use connecting transportation vehicles, for example, when one flies from Los Angeles to New Delhi, India, one may have to change planes in a different country, for example, in Dubai, UAE. To determine the gate for a connecting flight, amenities that may be available on way to the gate and/or if applicable, finding transportation to get to the gate, typically requires manual effort. One may be tempted to use a mobile phone to obtain flight and gate information (if available) but roaming charges can be very expensive in foreign countries and undesirable. Furthermore, mobile phone connections at the airport can also be unreliable. Continuous efforts are being made to improve passenger travel experience.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system", and the like as used herein are intended to refer to a computer-related entity, either software-executing general purpose processor, hardware, firmware or a combination thereof. For example, a component may be, but is not limited to being, a process running on a hardware processor, a hardware processor, an object, an executable, a thread of execution, a program, and/or a computing device.

By way of illustration, both an application running on a server and the server can be a component. One or more components may reside within a process and/or thread of execution, and a component may be localized on one computer and/or distributed between two or more computers. Also, these components can execute from various non-transitory, computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, in non-transitory, computer/machine readable media including, but not limited to, an ASIC (application specific integrated circuit), CD (compact disc), DVD (digital video disk), ROM (read only memory), hard disk, EEPROM (electrically erasable programmable read only memory), solid state memory device or any other storage device, in accordance with the claimed subject matter.

Figure 1:
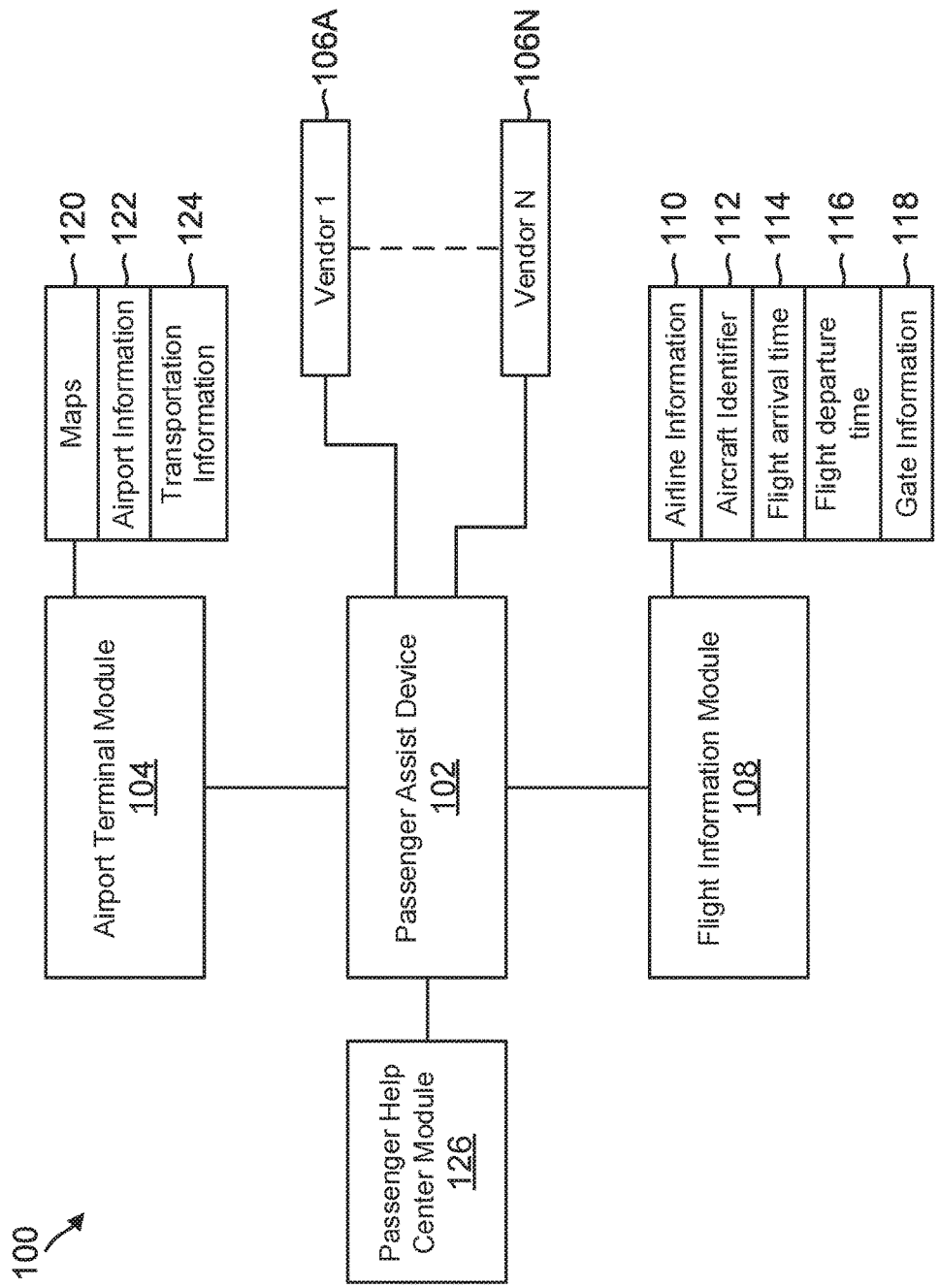
FIG. 1 shows an example of an operating environment for implementing the various aspects of the present disclosure.

Overall System:

FIG. 1 shows a block diagram of a system 100 with a passenger assist device (PAD) 102, according to one aspect of the present disclosure. The description below is based on using PAD 102 at an airport, however, the various adaptive aspects of the present disclosure are not limited to an airport and may be implemented at train stations, bus stations, ship terminals and other locations where passengers board transportation vehicles.

In one aspect, PAD 102 is configured for use at an airport, described below in detail. PAD 102 communicates with various vendor computing systems 106A-106N (may be referred to as 106). The vendor computing systems 106 provide information regarding goods and services offered by the vendors, for example, restaurant menus, happy hour information, discount or sale information, or any other information.

PAD 102 also communicates with an airport terminal module 104 that maintains terminal maps 120 and airport information 122 regarding any repairs or gate closures or any other information. The airport terminal module 104 also maintains transportation information 124 regarding any trains or any other mode of transportation that passengers have to take to reach certain terminals and gates. Maps 120, airport information 122 and transportation information 124 may be stored on a storage device accessible to the airport terminal module 104 and is updated frequently, for example, when conditions at the airport change.

In one aspect, maps 120, airport information 122 and transportation information 124 may be pre-loaded on the PAD 104 and when the information changes, the changed information is downloaded to PAD 102. In one aspect, the airport terminal module 104 is a secured computing system that can only be accessed when PAD 102 has been securely configured and authenticated using secured SSID (secured set identifier).

In one aspect, PAD 102 also communicates with a flight information module 108 that maintains flight information for different airlines, for example, airline information 110, aircraft identifier (for example, tail number) 112, flight arrival times 114, flight departure times 116 and arrival/departure gate information 118. This information may be stored at a storage location accessible to the flight information module 108. As an example, the flight information module 108 may be a ground server that communicates with aircraft to track arrival, departure and gate information.

In one aspect, PAD 102 further communicates with a passenger help center system 126. The passenger help center 126 is configured to receive communication from PAD 102, when a passenger needs help, as described below in detail.

Figure 2:
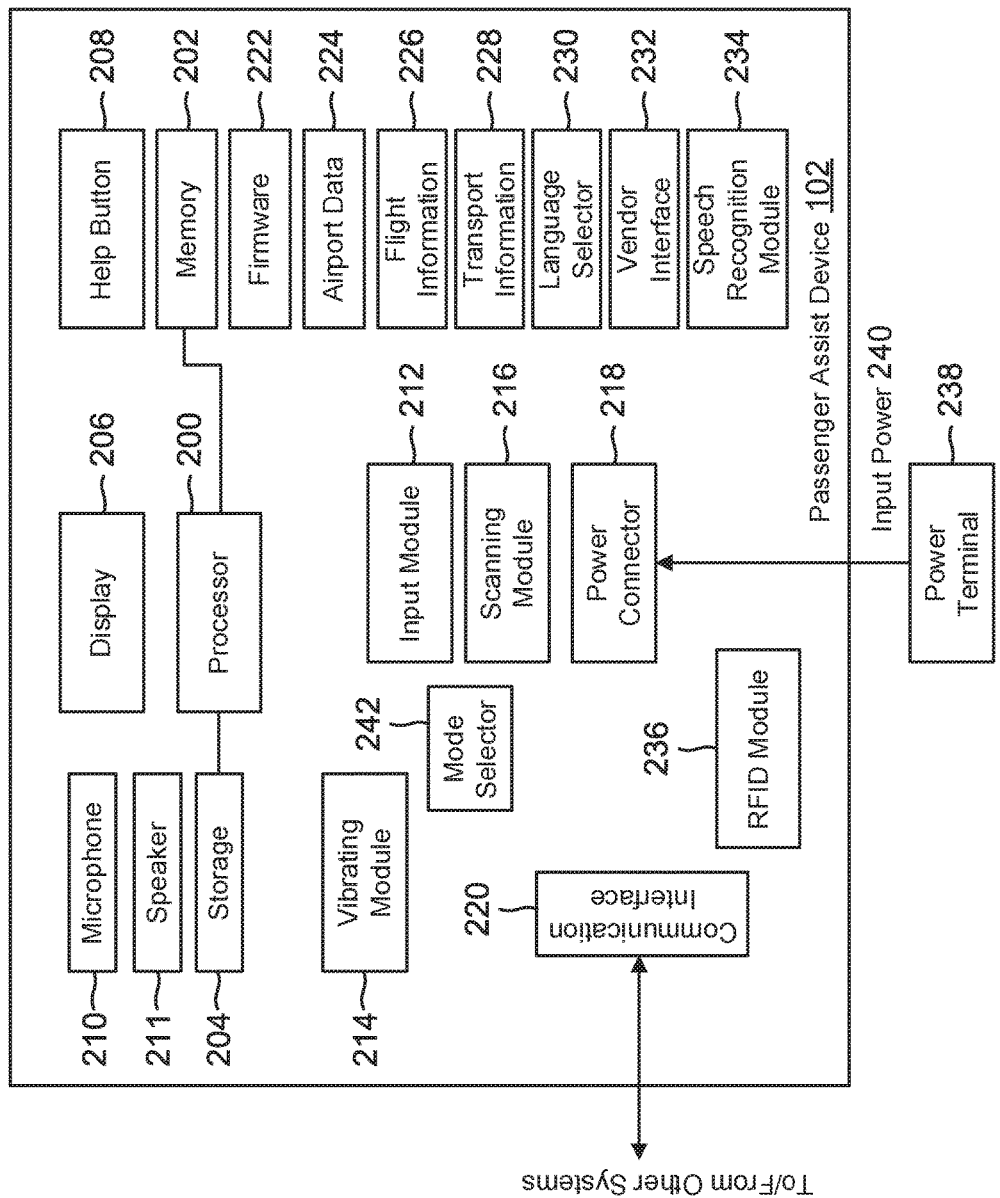
FIG. 2 shows a block diagram of the functional architecture of a passenger assist device (PAD), according to one aspect of the present disclosure.

PAD 102:

FIG. 2 shows a detailed functional block diagram of PAD 102, according to one aspect. PAD 102 receives input power 240 via a power connector 218 coupled to a power terminal 238. In one aspect, the power terminal 238 may be located outside different airport gates where flights arrive or at any other location. In another aspect, PAD 102 may be powered using a battery and are placed at a receptacle that is designed based on the form factor for the PAD 102. The adaptive aspects described herein are not limited to any specific methodology to power PAD 102 or any specific form factor of PAD 102.

In one aspect, PAD 102 includes a communication interface 220 to communicate with vendors 106, the airport terminal module 104, the flight information module 108, the passenger help center module 126 or any other device. The communication interface 220 may include one or more network interface to communicate with these various modules. In one aspect, the communication interface 220 may be configured to operate within a wired and/or wireless communication network, including a telephone network, a local area network (LAN), a wide area network (WAN), a campus area network (CAN), personal area network (PAN) and/or a wireless local area network (WLAN), of any kind exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. The adaptive aspects of the present disclosure are not limited to any specific network type/protocol.

In one aspect, PAD 102 includes a processor 200 with access to a memory 202 and storage 204 via one or more bus/interconnect system. The bus system may be an abstraction that represents any one or more separate physical buses and/or point-to-point connections, connected by appropriate bridges, adapters and/or controllers. The bus system may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

Processor 200 may be, or may include, one or more programmable general-purpose or special-purpose microprocessors, Reduced Instruction Set Computing (RISC) processor, digital signal processors (DSPs), programmable controllers, application specific integrated circuits (ASICs), programmable logic devices (PLDs), or the like, or a combination of such devices.

Memory 202 represents any form of random access memory (RAM), read-only memory (ROM), flash memory, or the like, or a combination of such devices. Memory 202 includes the main memory of PAD 102 and stores the firmware instructions 222 for controlling the overall operation of PAD 102.

Storage devices 204 may be non-volatile, for example, flash memory, or a solid-state drive that is used to store structure or unstructured data for PAD 102. For example, PAD 102 stores airport data 224 that is based on maps 120 and airport information 122. Airport data 224 is used to assist a passenger to reach their connecting gate, as described below in detail.

In another aspect, PAD 102 retrieves live flight information 226 from the flight information module 108. The flight information 226 may include airline information, aircraft departure/arrival and gate information.

In another aspect, PAD 102 also stores transportation information 228 that provides information regarding other transportation vehicle type that a passenger may have to take to reach a gate. It is noteworthy that transportation information 228 may be a part of the airport data 224.

In another aspect, PAD 102 includes a language selector module 230 that enables a user to select a language using a display 206. The display 206 may include a touch screen. PAD 102 also includes an input module 212 for receiving passenger input, for example, a keyboard, a touch screen or any other device. The various aspects described herein are not limited to any specific input method.

In another aspect PAD 102 includes a vendor interface 232 that interfaces with different vendors at the airport. The vendor interface may be an application programming interface (API) that enables different vendors to push information regarding their goods and services, including discount and sale information. This information is made available to the passenger when the passenger obtains PAD 102.

PAD 102 also includes a speech recognition module 234 that can receive input via voice commands from a microphone 210 and provide a response via one or more speakers 211. This enables passengers who may not be able to or choose not to provide input via a touch screen or input module 212.

PAD 102 also includes a help button 208 which connects PAD 102 to the passenger help center module 126 to receive assistance in reaching their gate or any other type of help.

PAD 102 further includes a scanning module 216 that can scan a QR or bar code from a boarding pass to determine the connecting flights for a passenger based on passenger itinerary, as described below in detail.

In one aspect, PAD 102 also includes a RFID module 236 that is configured to track PAD 102 movements. If PAD 102 is taken out of the airport, an alarm is triggered to prevent PAD 102 theft and/or loss. PAD 102 further includes a vibration module 214 that causes vibration when PAD 102 is close to the airport boundary or if a passenger makes a wrong turn while in transit to their gate.

In one aspect, PAD 102 includes a mode selector 242 that enables a user to select a language of communication, whether the passenger would like to use audio commands/response and other options. The mode selector 242 enables a passenger to customize and configure PAD 102, based on passenger needs/limitations.

Details for configuring and using PAD 102 are provided below.

Figure 3:
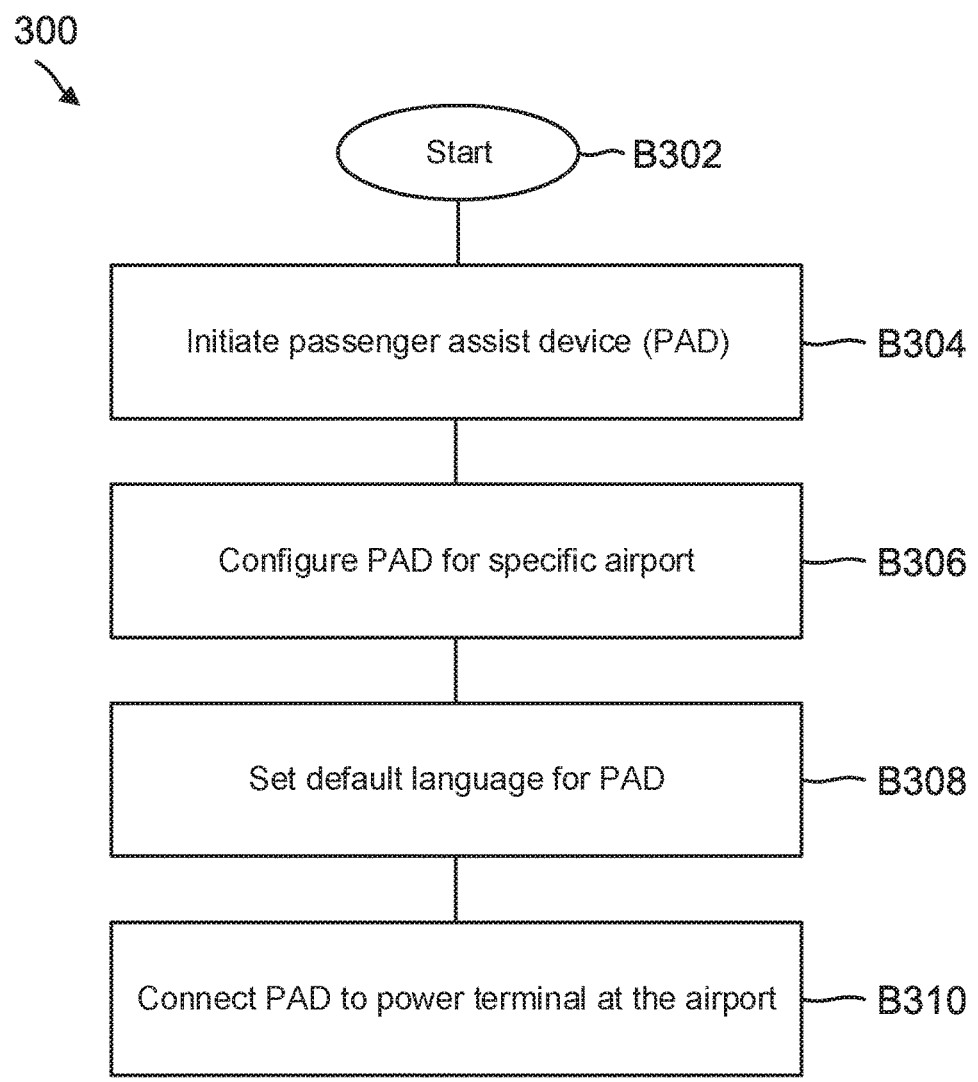
FIG. 3 shows a process flow for configuring a PAD, according to one aspect of the present disclosure.

Process Flows:

FIG. 3 shows a process 300 for configuring PAD 102 for passenger use at an airport or any other similar location for other vehicles, according to one aspect of the present disclosure. The process begins in block B302 and in one aspect, PAD 102 may be coupled to another computing device (not shown) for configuration. In block B304, PAD 102 is initialized. In block B306, PAD 102 is configured for a specific airport. This entails storing airport data 224, configuring the RFID module 236 so that if PAD 102 is taken out of the airport or beyond a specific zone, an alarm (audible and/or non-audible) is triggered.

In block B308, a default language is set using the language selector 230. Once PAD 102 is ready for use, it is coupled to power terminal 238, so that a passenger upon disembarking from a plane can take PAD 102 to reach their desired gate/connecting flight, as described below in detail.

Figure 4:
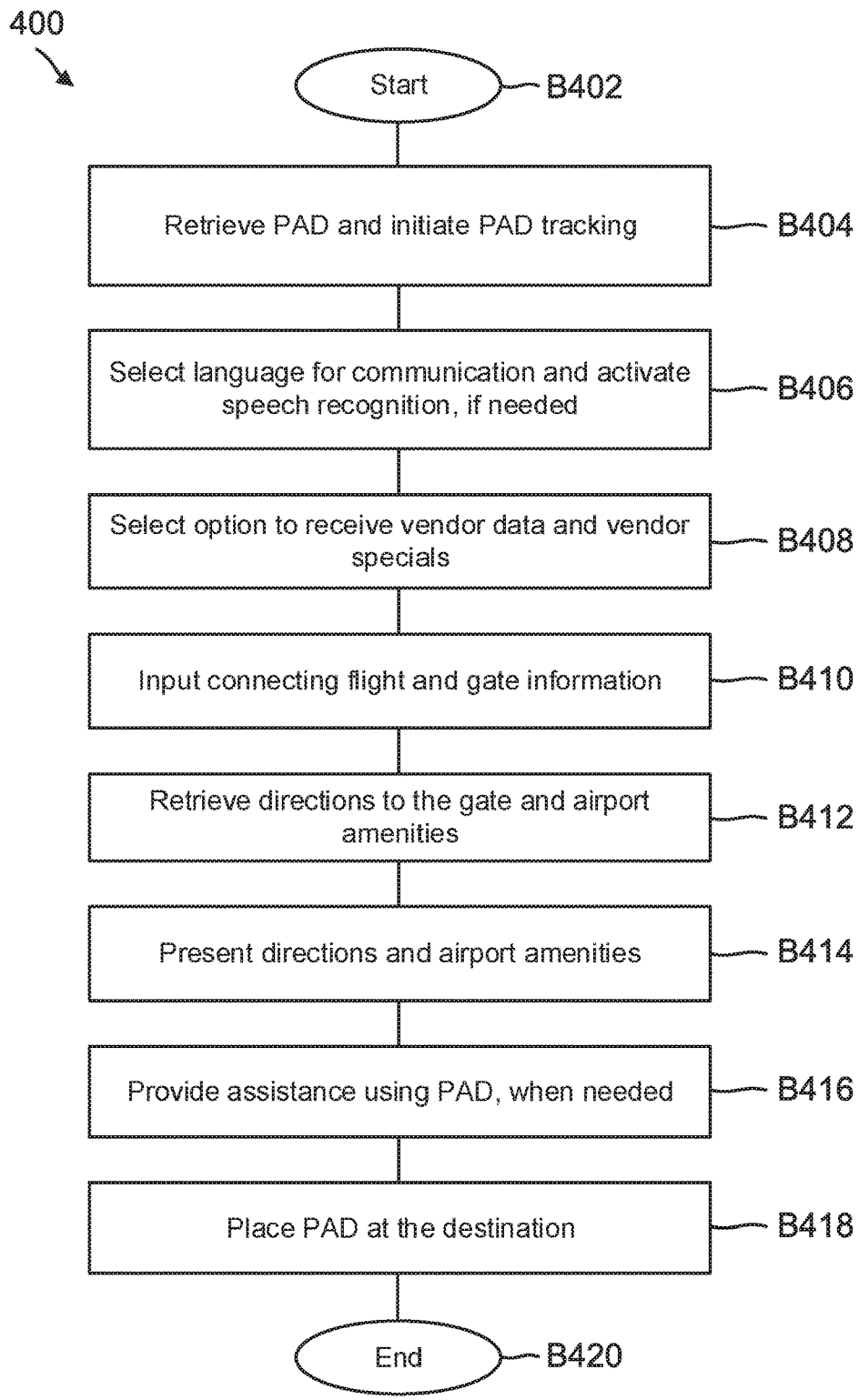
FIG. 4 shows a process flow for using a PAD, according to one aspect of the present disclosure.

FIG. 4 shows a process 400 for using PAD 102, according to one aspect of the present disclosure. The process begins in block B402, after PAD 102 has been configured for use at a particular airport terminal using process 300 described above. In another aspect, PAD 102 may be used at a bus terminal, train station, shipping dock or any other location.

In block B404, a passenger retrieves PAD 102 from the power terminal 238. The passenger may retrieve PAD 102 after disembarking from a flight or otherwise, for example, when the passenger enters the airport to board a flight. The RFID module 236 is initialized for tracking PAD 102 movement to reduce theft.

In block B406, PAD 102 may present a user interface at display 206 using mode selector 242. The user interface may be in more than one language. The passenger may then select a default language or another language using language selector 230. The passenger may also choose to initialize the speech recognition module 234 for using voice commands to obtain information from PAD 102.

In block B408, the passenger may be prompted to select an option for receiving vendor data, vendor discounts and updates from vendor systems 106. This may be accepted using a user interface (not shown) that may be displayed at display 206. The user interface may also prompt the passenger to enter basic information, for example, name, flight, email address, login information (when required) and other information. In one aspect, in block B410, the passenger provides connecting flight information. This may be manually input or retrieved from a QR or bar code of a boarding pass. This enables PAD 102 to retrieve the latest flight/gate information from flight information module 108. Based on the flight/gate information, PAD 102 retrieves directions to the connecting gate using airport data 224 in block B412. PAD 102 may also retrieve information regarding various amenities, for example, restrooms, restaurants, shops and others from airport data 224 and vendor interface 232.

In block B414, directions and information regarding amenities are presented to the passenger. This information may be presented via display 206, and/or speaker 211 using the speech recognition module 234 based on the operating mode of PAD 102. After the information is received, the passenger may start heading towards the gate. If the passenger needs assistance, then appropriate assistance is provided in block B416 using help button 208. This may also include using the vibration module 214, if the passenger makes a wrong turn or is going in the wrong direction and/or providing voice commands to correct course. This may also include providing in-person help via the help button 208. Once the passenger reaches the destination, PAD 102 is placed at another power terminal 238 in block B418. Thereafter, the process ends.

In one aspect, an intuitive PAD 102 with stored instructions are provided for passengers at airports and other similar locations. PAD 102 not only provides step by step directions, amenities information but can also provide live help, when needed. PAD 102 information is updated and tracked while PAD 102 is being used. The RFID module 236 helps prevent PAD 102 from being stolen or misplaced. Because of PAD 102, one does not have to incur roaming and other charges at the airport. Security concerns are also mitigated because secured connections are used for communication.

In one aspect, methods and systems for boarding a transportation vehicle are provided. One method includes configuring a PAD for use at a location for arriving and departing transportation vehicles by storing location data with maps and amenities information for the location; initializing a location tracking module to prevent unauthorized removal of the PAD from the location by a passenger; selecting a language by the passenger for communication with the PAD, when the passenger does not want to use a default language; retrieving connection and passenger transportation vehicle boarding location from where the passenger boards the vehicle; and presenting directions to the boarding location and information regarding amenities on way to the boarding location.

Another method includes interfacing a PAD with an airport terminal module for retrieving information regarding airport maps and a flight information module for retrieving information regarding specific flights including departure time and gate information; initializing a location tracking module to prevent unauthorized removal of the PAD from the airport when a passenger obtains the PAD to reach a gate; selecting a language by the passenger for communication with the PAD, when the passenger does not want to use a default language; retrieving connecting flight and gate information for the passenger; and presenting directions to the gate and information regarding amenities on way to the gate.

Figure 5:
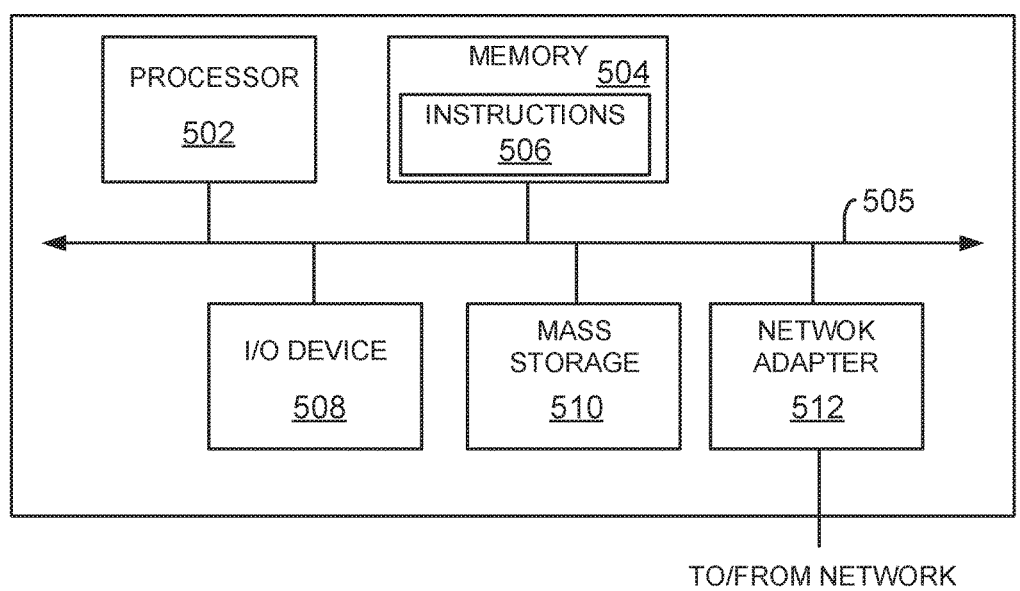
FIG. 5 shows a block diagram of a computing system, used according to one aspect of the present disclosure.

Processing System:

FIG. 5 is a high-level block diagram showing an example of the architecture of a processing system 500 that may be used according to one aspect. The processing system 500 can represent vendor system 106, airport terminal module 104, flight information module 108, a passenger help center 126 and a computing device to execute process flow of FIG. 3. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a PCI-Express bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other interconnect type.

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 3-4 described above.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks, flash memory, or solid-state drive.

The network adapter 512 provides the processing system 500 with the ability to communicate with remote devices (e.g., over a network and may be, for example, an Ethernet adapter or the like).

The processing system 500 also includes one or more input/output (I/O) devices 508 coupled to the bus system 505. The I/O devices 508 may include, for example, a display device, a keyboard, a mouse, etc. The I/O device may be in the form of a handset having one or more of the foregoing components, such as a display with a real or virtual keyboard, buttons, and/or other touch-sensitive surfaces.

Thus, methods and systems for a PAD have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
configuring a passenger assist device (PAD) for use at a location for arriving and departing transportation vehicles by setting a default language for the PAD, storing location data with maps and amenities information for the location and charging the PAD using a power terminal at the location for making the PAD available for passenger use at the location;
selecting a language by a passenger for communication with the PAD, when the passenger does not want to use the default language;
selecting an option for enabling the PAD to receive any vendor information at the location;
retrieving from a passenger boarding pass by the PAD, connection and passenger transportation vehicle boarding location from where the passenger boards the vehicle;
presenting directions by the PAD to the boarding location and information regarding amenities along a route to the boarding location; wherein when needed, the PAD provides assistance via one or more of audio, text, and audio and text to the passenger along the route to the boarding location; and
charging the PAD at a power terminal of the boarding location for use by another passenger.

2. The method of claim 1, wherein the transportation vehicle is an aircraft, the location is an airport and the boarding location is a terminal gate.

3. The method of claim 2, wherein the PAD presents information regarding various vendors in transit to the terminal gate including goods and services offered by the vendors.

4. The method of claim 2, wherein the PAD provides information regarding any alternate transportation mode for reaching the terminal gate.

5. The method of claim 2, wherein the PAD obtains flight and terminal gate information from an electronic boarding pass of the passenger.

6. The method of claim 1, wherein the PAD interfaces with a help center for providing assistance to the passenger along the route to the boarding location.

7. The method of claim 1, wherein the PAD provides a mode selector for receiving information in writing on a display device or for receiving auditory instructions in a passenger defined language.

8. The method claim 1, wherein the transportation vehicle is one of a train, bus, ship and recreation vehicle.

9. A machine implemented method, comprising:
interfacing a passenger assist device (PAD) with an airport terminal module for retrieving information regarding airport maps and a flight information module for retrieving information regarding specific flights including departure time and gate information;
setting a default language for the PAD and charging the PAD using a power terminal at an airport terminal for making the PAD available for passenger use;
selecting a language by a passenger for communication with the PAD, when the passenger does not want to use the default language;
selecting an option for enabling the PAD to receive any vendor information at the airport terminal;
retrieving by the PAD from a boarding pass, connecting flight and gate information for the passenger;
presenting directions to the gate and information regarding amenities along a route to the gate, wherein when needed, the PAD provides assistance via one or more of audio, text, and audio and text to the passenger along the route to the gate; and
charging the PAD at a power terminal at the gate for use by another passenger.

10. The method of claim 9, wherein the PAD presents information regarding various vendors in transit to the gate including goods and services offered by the vendors.

11. The method of claim 9, wherein the PAD provides information regarding any alternate transportation for reaching the gate.

12. The method of claim 9, wherein the PAD obtains flight and gate information from an electronic boarding pass of the passenger.

13. The method of claim 9, wherein the PAD interfaces with a help center for providing assistance to the passenger along the route to the gate.

14. The method of claim 9, wherein the PAD provides a mode selector for receiving information in writing on a display device or auditory instructions in a passenger defined language.

15. A passenger assist device (PAD), comprising:
a memory having machine readable medium comprising machine executable code having stored thereon instructions; and a processor module coupled to the memory executes the machine executable code to:
interface with an airport terminal module for retrieving information regarding airport maps and a flight information module for retrieving information regarding specific flights including departure time and gate information;
set a default language and charge the PAD using a power terminal at an airport terminal for making the PAD available for passenger use;
select a language by a passenger for communication with the PAD, when the passenger does not want to use the default language;
select an option for enabling the PAD to receive any vendor information at the airport terminal;
retrieve from a boarding pass, connecting flight and gate information for the passenger;
present directions to the gate and information regarding amenities along a route to the gate, wherein when needed, the PAD provides assistance via one or more of audio, text, and audio and text to the passenger along the route to the gate; and charge the PAD at a power terminal at the gate for use by another passenger.

16. The PAD of claim 15, wherein the PAD presents information regarding various vendors in transit to the gate including goods and services offered by the vendors.

17. The PAD of claim 15, wherein the PAD provides information regarding any alternate transportation for reaching the gate.

18. The PAD of claim 15, wherein the PAD obtains flight and gate information from an electronic boarding pass of the passenger.

19. The PAD of claim 15, wherein the PAD interfaces with a help center for providing assistance to the passenger along the route to the gate.

20. The PAD of claim 15, wherein the PAD provides a mode selector for receiving information in writing on a display device or auditory instructions in a passenger defined language.

\* \* \* \* \*